US012675644B2

(12) United States Patent
Dhamecha et al.

(10) Patent No.: US 12,675,644 B2
(45) Date of Patent: Jul. 7, 2026

(54) TASK-SPECIFIC LANGUAGE SETS FOR MULTILINGUAL LEARNING

(71) Applicant: INTERNATIONAL BUSINESS MACHINES CORPORATION, Armonk, NY (US)

(72) Inventors: Tejas Indulal Dhamecha, Bangalore (IN); Samarth Bharadwaj, Bangalore (IN); Rudra Murthy Venkataramana, Bangalore (IN); Jaydeep Sen, Bangalore (IN); Anupama Ray, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 17/807,744

(22) Filed: Jun. 20, 2022

(65) Prior Publication Data

US 2023/0410682 A1     Dec. 21, 2023

(51) Int. Cl.
G06F 40/40           (2020.01)

(52) U.S. Cl.
CPC .................................... G06F 40/40 (2020.01)

(58) Field of Classification Search
CPC .... G06F 40/211; G06F 40/253; G06F 40/268; G06F 40/284; G06F 40/30; G06F 40/58; G06F 40/44; G06F 40/45; G06F 40/47
See application file for complete search history.

(56) References Cited

U.S. PATENT DOCUMENTS

| | | | |
|---|---|---|---|
| 9,471,667 B2 | 10/2016 | Yamamoto | |
| 10,685,188 B1 * | 6/2020 | Zhang | G06F 40/263 |

| | | | |
|---|---|---|---|
| 10,754,883 B1 * | 8/2020 | Kannu | G06F 16/36 |
| 11,544,558 B2 * | 1/2023 | Shaker | G06N 3/0895 |
| 11,551,668 B1 * | 1/2023 | Baevski | G06F 18/2155 |
| 11,574,713 B2 * | 2/2023 | Guo | G06F 16/335 |
| 11,734,514 B1 * | 8/2023 | Shorter | G06F 40/30 |
| | | | 704/2 |
| 11,836,454 B2 * | 12/2023 | Fridman | G06F 40/58 |
| 12,118,324 B1 * | 10/2024 | Zhang | G06F 16/355 |
| 12,136,250 B2 * | 11/2024 | Pham | G06N 3/09 |
| 12,321,355 B2 * | 6/2025 | Bierner | G06F 18/2415 |

(Continued)

FOREIGN PATENT DOCUMENTS

| | | |
|---|---|---|
| CN | 110765783 A | 2/2020 |

OTHER PUBLICATIONS

Blackwood et al., "Multilingual Neural Machine Translation with Task Specific Attention", Proceedings of the 27th International conference on Computational Linguistics, Aug. 20-26, 2018, pp. 3112-3122.

(Continued)

*Primary Examiner* — Lamont M Spooner

(74) *Attorney, Agent, or Firm* — Kristofer Haggerty

(57)           ABSTRACT

A method, a structure, and a computer system for multilingual learning. The exemplary embodiments may include training, for each language in a set of two or more languages, a model for a task and identifying one or more important words appearing in at least two of the models. The exemplary embodiments may further include weighting one or more conflicts and one or more overlaps between the one or more important words, as well as generating a cluster of at least two languages of the set based on an aggregate of the weighting.

17 Claims, 6 Drawing Sheets

(56)                  References Cited

U.S. PATENT DOCUMENTS

| | | | | |
|---|---|---|---|---|
| 2013/0268260 A1* | 10/2013 | Lundberg | G06F 40/58 | |
| | | | | 704/8 |
| 2015/0127373 A1 | 5/2015 | Li | | |
| 2016/0062985 A1* | 3/2016 | Epstein | G06F 40/216 | |
| | | | | 704/9 |
| 2018/0121799 A1* | 5/2018 | Hashimoto | G06N 3/084 | |
| 2018/0137419 A1* | 5/2018 | Byron | G06N 5/022 | |
| 2019/0244108 A1* | 8/2019 | Meyerson | G06N 3/082 | |
| 2019/0244116 A1* | 8/2019 | Chittimalli | G06F 40/289 | |
| 2020/0043495 A1 | 2/2020 | Park | | |
| 2020/0160836 A1* | 5/2020 | Chen | G10L 15/005 | |
| 2020/0210523 A1* | 7/2020 | Aghajanyan | G06N 3/0442 | |
| 2020/0265074 A1* | 8/2020 | Tang | G06F 16/3344 | |
| 2020/0410292 A1* | 12/2020 | Trim | G06N 3/0464 | |
| 2021/0224660 A1* | 7/2021 | Song | G06N 3/088 | |
| 2022/0138414 A1* | 5/2022 | Wang | G06N 3/08 | |
| | | | | 704/9 |
| 2022/0147721 A1* | 5/2022 | Galle | G06N 3/08 | |
| 2022/0229994 A1* | 7/2022 | Sharma | H04L 51/18 | |
| 2022/0237391 A1* | 7/2022 | Zhang | G06F 40/284 | |
| 2022/0238103 A1* | 7/2022 | Madhusudhan | G10L 15/16 | |
| 2022/0245343 A1* | 8/2022 | Brun | G06N 3/096 | |
| 2022/0300707 A1* | 9/2022 | Kare | G06F 40/169 | |
| 2022/0405490 A1* | 12/2022 | Krause | G06F 40/253 | |
| 2023/0046851 A1* | 2/2023 | Ogura | G06F 40/30 | |
| 2023/0098783 A1* | 3/2023 | Zaremoodi | G06N 3/044 | |
| | | | | 704/243 |
| 2023/0153546 A1* | 5/2023 | Peleg | G06F 40/56 | |
| | | | | 704/9 |
| 2023/0177279 A1* | 6/2023 | Frosst | G06N 3/096 | |
| | | | | 704/9 |
| 2023/0214605 A1* | 7/2023 | Bérard | G06F 40/42 | |
| | | | | 704/2 |
| 2023/0297603 A1* | 9/2023 | M'hamdi | G06F 40/279 | |
| 2023/0297606 A1* | 9/2023 | Miao | G06F 16/35 | |
| | | | | 704/9 |
| 2023/0359835 A1* | 11/2023 | Malur Srinavasan | G06F 40/30 | |
| 2023/0394250 A1* | 12/2023 | Puri | G06F 40/30 | |
| 2024/0161732 A1* | 5/2024 | Chen | G10L 15/063 | |
| 2024/0185003 A1* | 6/2024 | Shou | G06F 40/30 | |

OTHER PUBLICATIONS

Chung et al., "Improving Multilingual Models with Language-Clustered Vocabularies", arXiv:2010.12777v1 [cs.CL] Oct. 24, 2020, pp. 1-11.

Huang et al., "Multi-lingual Common Semantic Space Construction via Cluster-consistent Word Embedding", Proceedings of the 2018 Conference on Empirical Methods in Natural Language Processing, Oct. 31-Nov. 4, 2018, pp. 250-260.

Mell et al., "The NIST Definition of Cloud Computing", National Institute of Standards and Technology, Special Publication 800-145, Sep. 2011, pp. 1-7.

Tan et al., "Multilingual Neural Machine Translation with Language Clustering", Proceedings of the 2019 Conference on Empirical Methods in Natural Language Processing, Nov. 3-7, 2019, pp. 963-973.

Vidoni et al., "Orthogonal Language and Task Adapters in Zero-Shot Cross-Lingual Transfer", arXiv:2012.06460v.1 [cs.CL] Dec. 11, 2020, pp. 1-9.

Zhang et al., "Share or Not? Learning to Schedule Language-Specific Capacity for Multilingual Translation", Published as a conference paper at ICLR 2021, pp. 1-19.

* cited by examiner

100

200

START

RECEIVE LANGUAGES L1 AND L2 LABELLED FOR TASK T

202

TRAIN TASK T MODELS FOR L1 AND L2

204

IDENTIFY MOST IMPORTANT WORDS OF TRAINING

206

IDENTIFY SEVERITY OF CONFLICTS BETWEEN IMPORTANT WORDS

208

IDENTIFY SEVERITY OF OVERLAPS BETWEEN IMPORTANT WORDS

210

WEIGHT CONFLICT AND OVERLAP

212

UTILIZE TASK DEPENDENT CLUSTERS FOR HIGHER ORDER TASKS

210

END

300

|  | EN | ES | HI | PA |
|---|---|---|---|---|
| EN |  |  |  |  |
| ES |  |  |  |  |
| HI |  |  |  |  |
| PA |  |  |  |  |

FIG. 3

TASK-SPECIFIC LANGUAGE SETS FOR MULTILINGUAL LEARNING

BACKGROUND

The exemplary embodiments relate generally to multilingual learning, and more particularly to task-specific language sets for multilingual learning.

Multi-lingual learning often involves clustering similar languages together for joint learning, which allows for training multiple languages at minimal additional cost. Though beneficial, clustering similar languages for joint learning is not universal but instead task-dependent. Under current approaches, joint learning is based primarily on a language family, or group of languages related through descent from a common ancestral language or parental language (i.e., proto-language of that language family).

SUMMARY

The exemplary embodiments disclose a method, a structure, and a computer system for task-specific multilingual learning. The exemplary embodiments may include training, for each language in a set of two or more languages, a model for a task and identifying one or more important words appearing in at least two of the models. The exemplary embodiments may further include weighting one or more conflicts and one or more overlaps between the one or more important words, as well as generating a cluster of at least two languages of the set based on an aggregate of the weighting.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which:

FIG. 3 depicts an exemplary inference table 300, in accordance with the exemplary embodiments.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
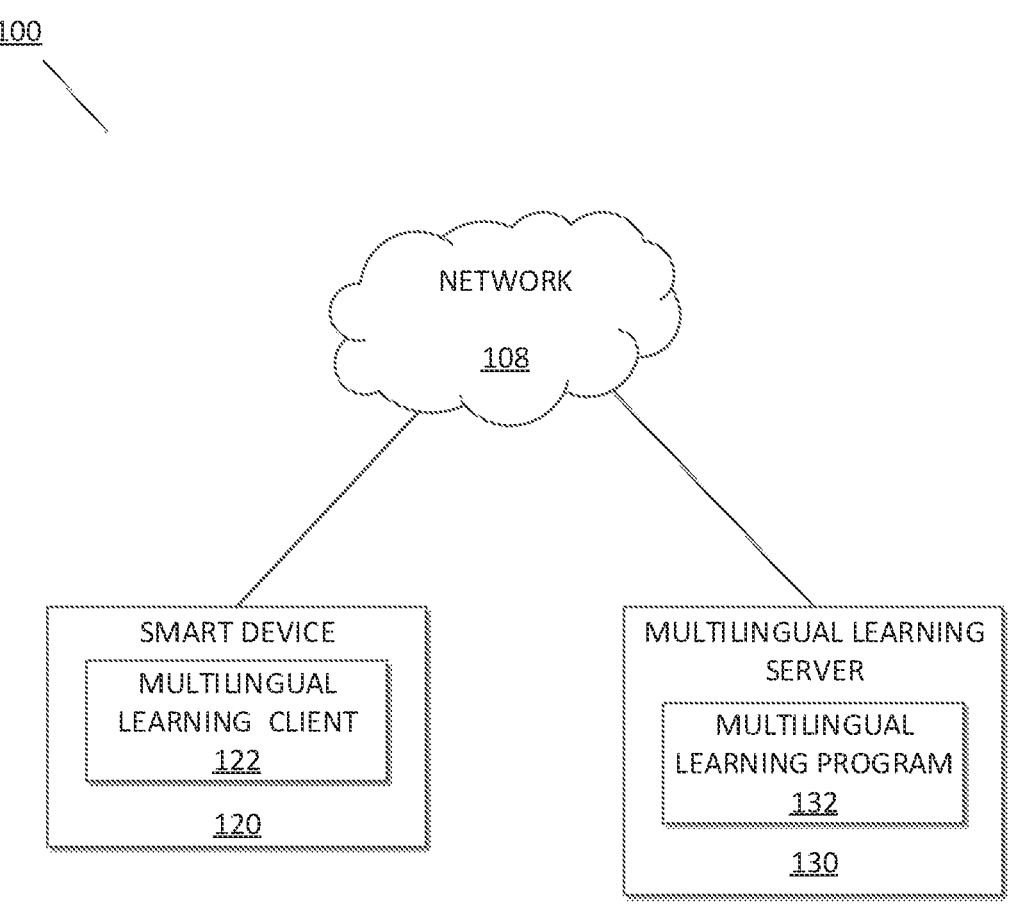
FIG. 1 depicts an exemplary schematic diagram of a multilingual learning system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Multi-lingual learning often involves clustering similar languages together for joint learning, which allows for training multiple languages at minimal additional cost. Though beneficial, clustering similar languages for joint learning is not universal but instead task-dependent. Under current approaches, joint learning is based primarily on a language family, or group of languages related through descent from a common ancestral language or parental language (i.e., proto-language of that language family).

Though one may suspect that clustering may be the same for all languages within a language family, this is not necessarily true. Rather, two closely related languages may interfere with each other positively or negatively for a given task. For example, despite the languages Marathi and Hindi sharing a language family, the phrase he was punished in Marathi may be interpreted as he received education in Hindi, a negative interference. Similarly, pain may be interpreted as an ache in English but as bread or pies in French or in Finnish, respectively, despite English, French, and Finnish all sharing a language family.

Clustering languages of a same family may further lead to negative interference due to semantic change, e.g., pejoration, amelioration, broadening, narrowing, etc., or due to grammatical differences. Moreover, grammatical characteristics such as word-order (SVO, SOV) and adjective-noun order (AN, NA) are shown to affect the joint training.

Thus, language set clusters for joint learning need not be based on family, but rather task. The present invention provides a data driven approach to generating task-specific language clusters through identifying positive and negative interferences between a language pair. In identifying positive and negative interferences, e.g., a change of semantics of cognate words (i.e., words in two languages that share a similar meaning, spelling, and pronunciation), the present invention improves higher-order, downstream tasks such as text classification (e.g. new article category, headline classification), natural language interference, and paraphrase detection. Part-of-speech (POS) tagging may additionally benefit as even cognate words sharing a same part-of-speech (POS) tag may nonetheless bear different sentiment and meaning, while semantic textual similarity, sentence embedding, sentiment classification may additionally improve due to fewer confusing signals.

Linguistically, interference is rooted in cognates, false cognates, and false friends. Cognates are words having the same origin as another word or language. False cognates are pairs of words that seem to be cognates because of similar sounds and meaning but have different etymologies; they can be within the same language or from different languages, even within the same family. Lastly, false friends are similar words in different languages that nonetheless have a different meaning.

FIG. 1 depicts the multilingual learning system 100, in accordance with exemplary embodiments. According to the exemplary embodiments, the multilingual learning system 100 may include a smart device 120 and a multilingual learning server 130, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. The operations of the multilingual learning system 100 are described in greater detail herein.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc., which may be implemented as an intranet network, a local area network (LAN), a wide area network (WAN), a combination thereof, etc. In further embodiments, the network 108 may be a Bluetooth network, a Wi-Fi network, a combination thereof, etc. The network 108 may operate in frequencies including 2.4gHz and 5gHz internet, near-field communication, etc. In yet further embodiments, the network 108 may be a telecommunications network used to facilitate telephone calls between two or more parties comprising a landline network, a wireless network, a closed network, a satellite network, a combination thereof, etc. In general, the network 108 may represent any combination of connections and protocols that will support communications between connected devices.

In exemplary embodiments, the smart device 120 includes a multilingual learning client 122, and may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 4, as part of a cloud implementation with reference to FIG. 5, and/or as utilizing functional abstraction layers for processing with reference to FIG. 6.

The multilingual learning client 122 may act as a client in a client-server relationship, e.g., with the multilingual learning server 130, and may be a software and/or hardware application capable of communicating with and providing a user interface for a user to interact with the multilingual learning server 130 and other computing devices via the network 108. Moreover, the multilingual learning client 122 may be further capable of transferring data from the smart device 120 to and from other devices via the network 108. In embodiments, the multilingual learning client 122 may utilize various wired and wireless connection protocols for data transmission and exchange, including Bluetooth, 2.4gHz and 5gHz internet, near-field communication (NFC), etc. The multilingual learning client 122 is described in greater detail with respect to FIG. 2-6.

In exemplary embodiments, the multilingual learning server 130 includes the multilingual learning program 132, and may act as a server in a client-server relationship with the multilingual learning client 122. The multilingual learning server 130 may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. While the multilingual learning server 130 is shown as a single device, in other embodiments, the multilingual learning server 130 may be comprised of a cluster or plurality of computing devices, in a modular manner, etc., working together or working independently. The multilingual learning server 130 is described in greater detail as a hardware implementation with reference to FIG. 4, as part of a cloud implementation with reference to FIG. 5, and/or as utilizing functional abstraction layers for processing with reference to FIG. 6.

The multilingual learning program 132 may be a software and/or hardware program that may receive a language set (i.e., languages L1, L2, . . . . Ln) labelled for task T. The multilingual learning program 132 may train one or more models for task T for each language within the language set, as well as identify the most important words identified during the training of the one or more models. The multilingual learning program 132 may identify a severity of any conflicts and overlaps between the important words, as well as aggregate a weight the conflicts and overlaps. The multilingual learning program 132 may cluster languages within the language set based on the aggregate weights, then utilize the task dependent clusters for higher order tasks. The multilingual learning program 132 is described in greater detail with reference to FIG. 2-6.

Figure 2:
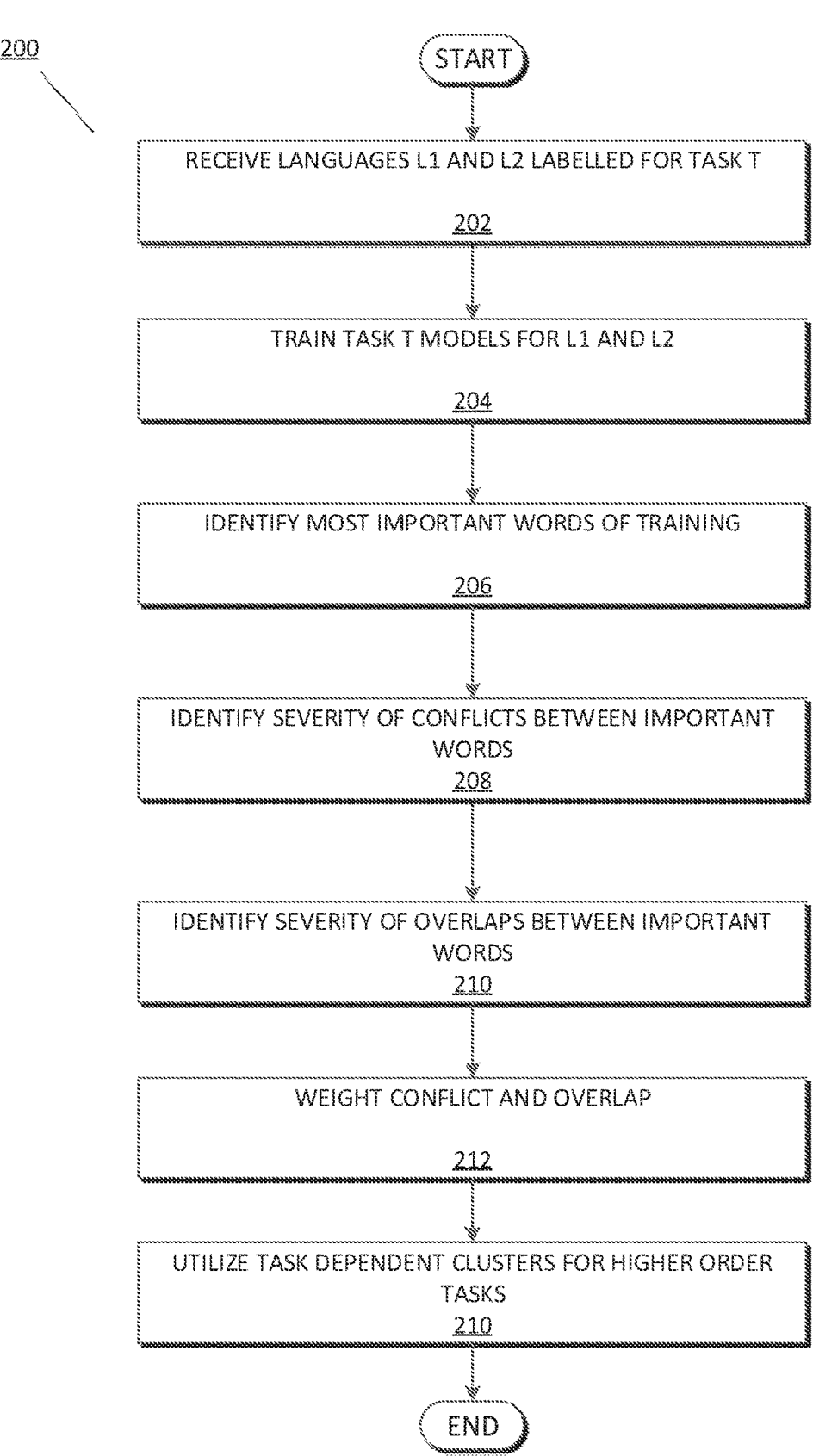
FIG. 2 depicts an exemplary flowchart 200 illustrating a multilingual learning program 132 of the multilingual learning system 100, in accordance with the exemplary embodiments.

FIG. 2 depicts an exemplary flowchart 200 illustrating the operations of the multilingual learning program 132 of the multilingual learning system 100, in accordance with the exemplary embodiments. In embodiments, the multilingual learning program 132 may be utilized to generate task-specific language sets for joint learning.

The multilingual learning program 132 may receive a language set (i.e., languages L1, L2, . . . . Ln) labelled for a task T (step 202). In embodiments, the multilingual learning program 132 may receive a language set of two or more languages (L1, L2, . . . . Ln) detailing text samples of the two or more languages for which joint learning is intended. For example, the multilingual learning program 132 may receive a set of around 20 languages L1-L20 inside or outside of a same family from which to cluster languages for a given task T. The language sets may be labelled for a task T such as sentiment classification, natural language interference, part-of-speech tagging, etc., and accordingly the labels may annotate a sentiment, interference (entanglement, contradiction), and POS of the language and/or segments thereof, etc. The text samples may be annotated for the languages L1 to Ln, e.g., a training set may include <text1, label1>, <text2, label2>, etc., and provided to the multilingual learning program 132 in a supervised or unsupervised manner.

In order to better illustrate the operations of the multilingual learning program 132, reference is now made to an illustrative example wherein multilingual learning program 132 receives language sets of English and French labelled with data relating to the task T of sentiment classification.

The multilingual learning program 132 may train task T models for languages within the language set (step 204). The multilingual learning program 132 may train models for task T for each language in the set received (i.e., L1, L2, . . . . Ln) based on the labelling, for example the labelled sentiment classification. The models may be trained for task T via any suitable means, such as fine-tuning a pre-trained language model. In such an embodiment, the multilingual learning program 132 may receive a language model that is pre-trained on large amounts of unlabeled data using, e.g., a language modelling loss such as masked language modelling. The multilingual learning program 132 may then fine-tune the model based on the task-labelled data of the languages L1-Ln using, e.g., standard cross-entropy loss. In embodiments, the fine-tuning of the model may be adaptive, behavioral, parameter-efficient, text-to-text, mitigating, etc. In general, the multilingual learning program 132 may use any technique to train one or more models for task T with respect to each language L within the language set.

Furthering the illustrative example introduced above, the multilingual learning program 132 trains a sentiment classification model for each of the languages English and French.

The multilingual learning program 132 may identify most important words used in training (step 206). In embodiments, the multilingual learning program 132 may identify the most important words as those most significant or dependent in determining a prediction during the training. In sentiment classification, e.g., most important words may be identified based on those that are sentiment bearing (polarity of sentiment). Alternatively, the multilingual learning program 132 may identify important words using attention weights where the attention-based models internally utilize something called self-attention, i.e. how much a word contributes to contextual meaning of other words in the sentence, and these weights that can be leveraged to identify important words. In other embodiments, the multilingual learning program 132 may utilize other techniques to identify important words, such as factor-analysis describing variability among observed, correlated variables in terms of a potentially lower number of unobserved variables called factors. In general, the multilingual learning program 132 may utilize any suitable means for identifying the most important words used during the training of the models for each of the languages L1-Ln.

With reference again to the formerly introduced example, the multilingual learning program 132 identifies the word pain as important during the training of sentiment classification models for languages English and French.

The multilingual learning program 132 may identify a severity of any conflicts between the most important words (step 208). The multilingual learning program 132 may identify conflicts as words having a negative interference with joint learning. For example, a negative interference may be a false friend or change of semantics. Restated, the multilingual learning program 132 identifies an extent to which similar words across languages within the language set connote differing sentiment (or other characteristic relevant to task T).

The multilingual learning program 132 may identify a severity of any overlaps (or entanglement) between the most important words (step 210). In embodiments, overlap is indicative of a positive interference between the language sets. The multilingual learning program 132 may identify overlaps based on proportion of overlapping words bearing the same sentiment within the languages of the set (or other characteristic relevant to task T).

The multilingual learning program 132 may identify negative and positive interference using a table such as that depicted by inference table 300 of FIG. 3.

In the inference table 300 of FIG. 3, a language set containing L1, . . . . Ln are depicted on the X and Y axis, i.e., English, Spanish, Hindi, and Punjabi. A common word between two (or more) languages is considered to be interfering positively if it affects the classification towards a same class across all languages, and it is considered negatively interfering if it affects classification towards different classes in different languages. The matrix of positive and negative interference can be obtained by aggregation across important words. In the inference table 300, interferences are indicated with a circle.

Returning to the formerly introduced example where the word pain was identified as an important word in training a sentiment classification model for languages French and English, the multilingual learning program 132 determines that the word pain bears negative sentiment for English and neutral sentiment for French.

The multilingual learning program 132 may weight the identified conflicts and overlaps (step 212). The multilingual learning program 132 may weight the conflicts and the overlaps based on the prior probability distribution of the terms, then determine an aggregate of the interference. The priors of the terms may be the term frequencies, and the weights are proportionate to the priors. The resulting aggregate weights may be utilized by the multilingual learning program 132 as a measure for generating task-dependent language clusters (extracted from the provided language set) used for joint learning in a given task. The multilingual learning program 132 may, e.g., separate the set of received languages into a cluster of two or more languages which each aggregately provide positive interference for a given task as well as a second cluster of two or more languages which each aggregately provide negative interference for the given task.

Continuing the aforementioned example, the multilingual learning program 132 weights the conflicts and the overlaps based on prior probability distribution of the terms, e.g., based on a frequency of the word pain.

The multilingual learning program 132 may utilize the task-dependent clusters for higher order tasks (step 214). Since one of the core factors contributing to task-dependence is a change of semantics of cognate words, higher-order tasks are likely to benefit by these task-specific learning sets, including downstream tasks such as text classification, natural language interference, paraphrase detection, multilingual LM, etc. Thus, the present invention improves upon the field of multilingual joint learning.

Concluding the aforementioned example, the multilingual learning program 132 utilizes the task dependent learning sets in downstream tasks such as text classification.

It should be noted that although the presently disclosed embodiment utilizes the specific task of sentiment analysis, alternative tasks may be similarly implemented when generating task specific language sets for multilingual joint learning. In embodiments, the multilingual learning program 132 may precompute or be provided a language similarity matrix similar to that of the inference table 300 in which positive and negative interference may be identified amongst two or more languages. The language similarity matrix may be generated, e.g., via attention weights, factor-analysis, etc., from which interference weights may be computed, aggregated, and utilized for clustering languages for the purpose of a given task.

Figure 4:
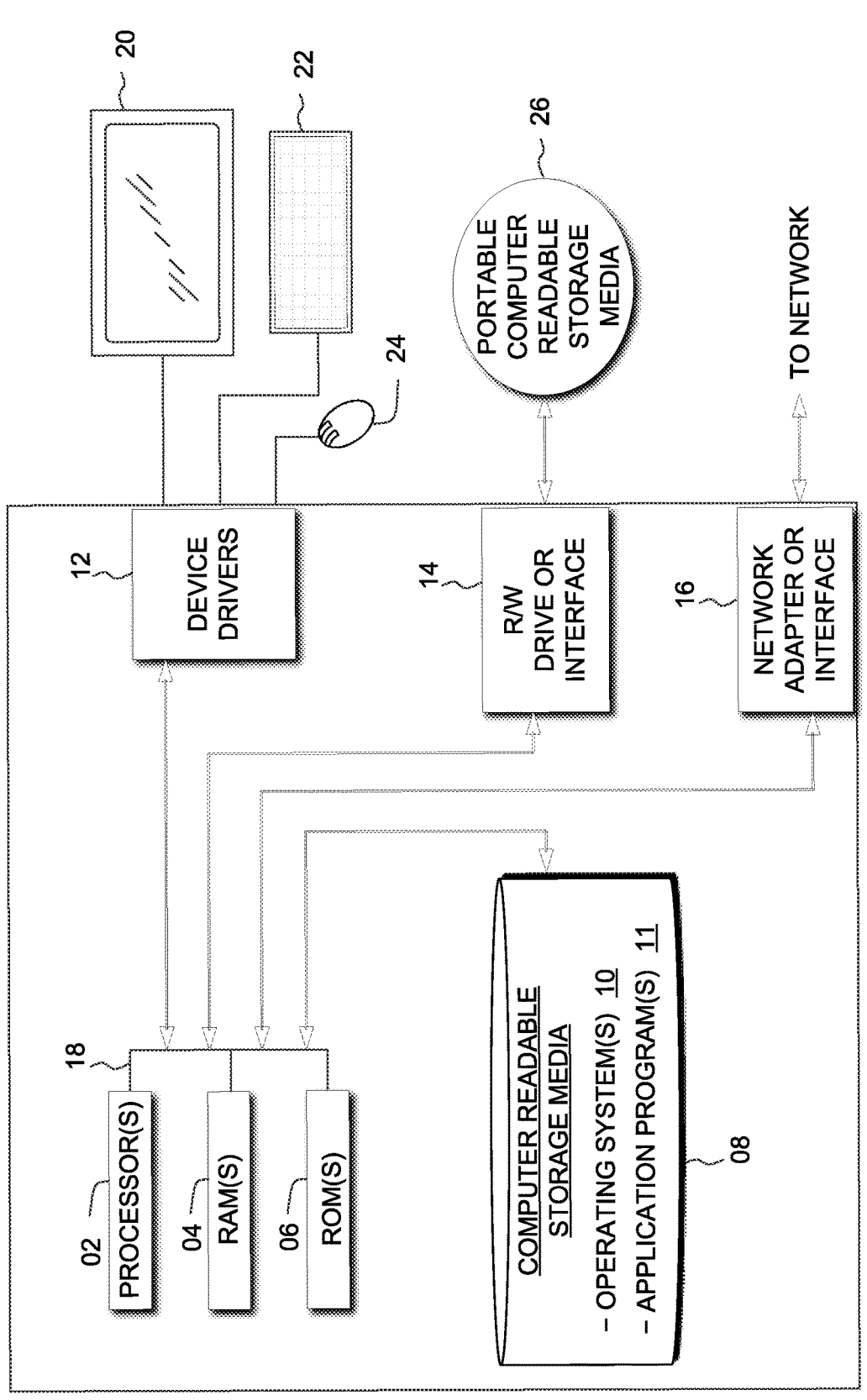
FIG. 4 depicts an exemplary block diagram depicting the hardware components of the multilingual learning system 100 of FIG. 1, in accordance with the exemplary embodiments.

FIG. 4 depicts a block diagram of devices used within multilingual learning system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
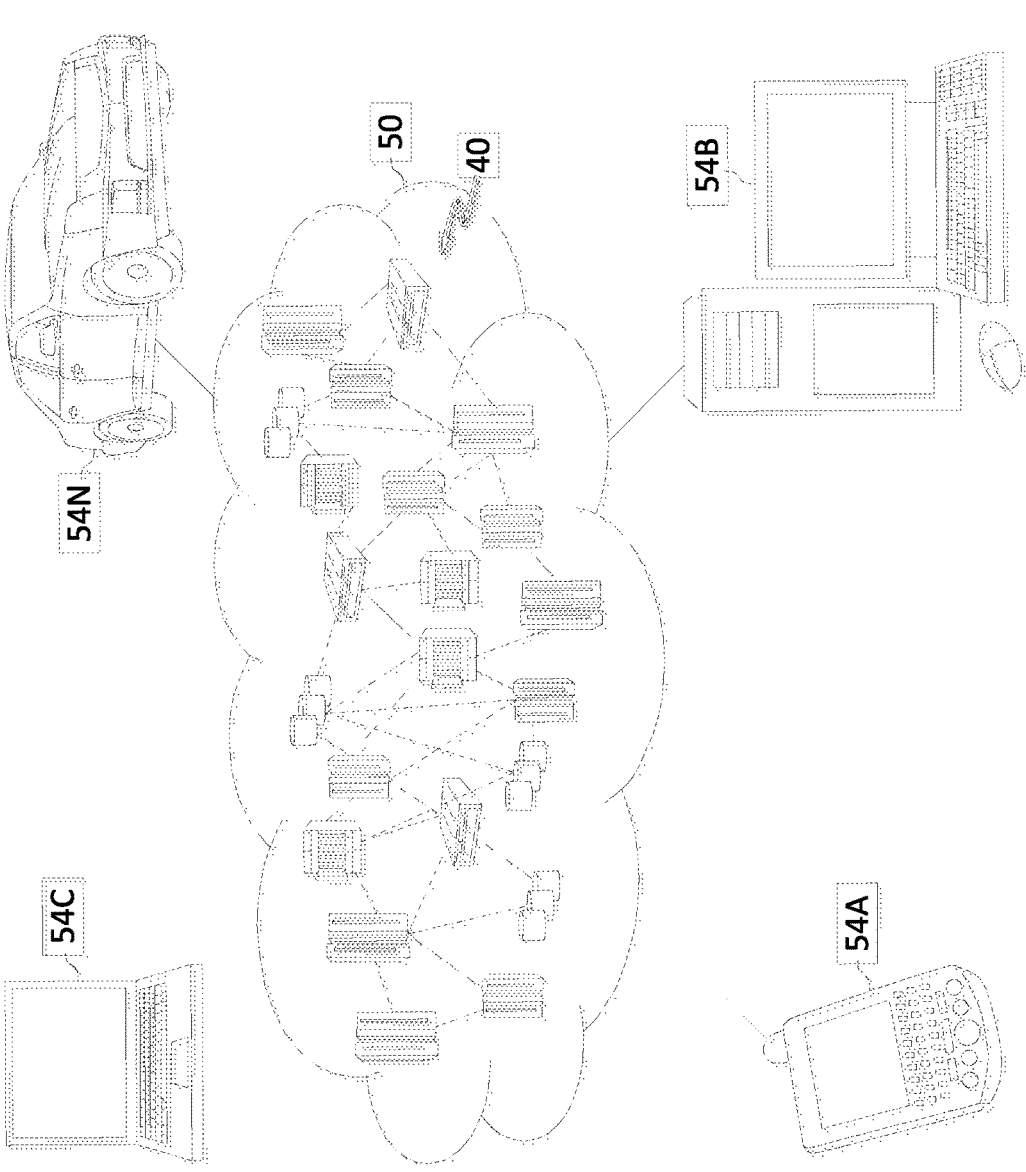
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
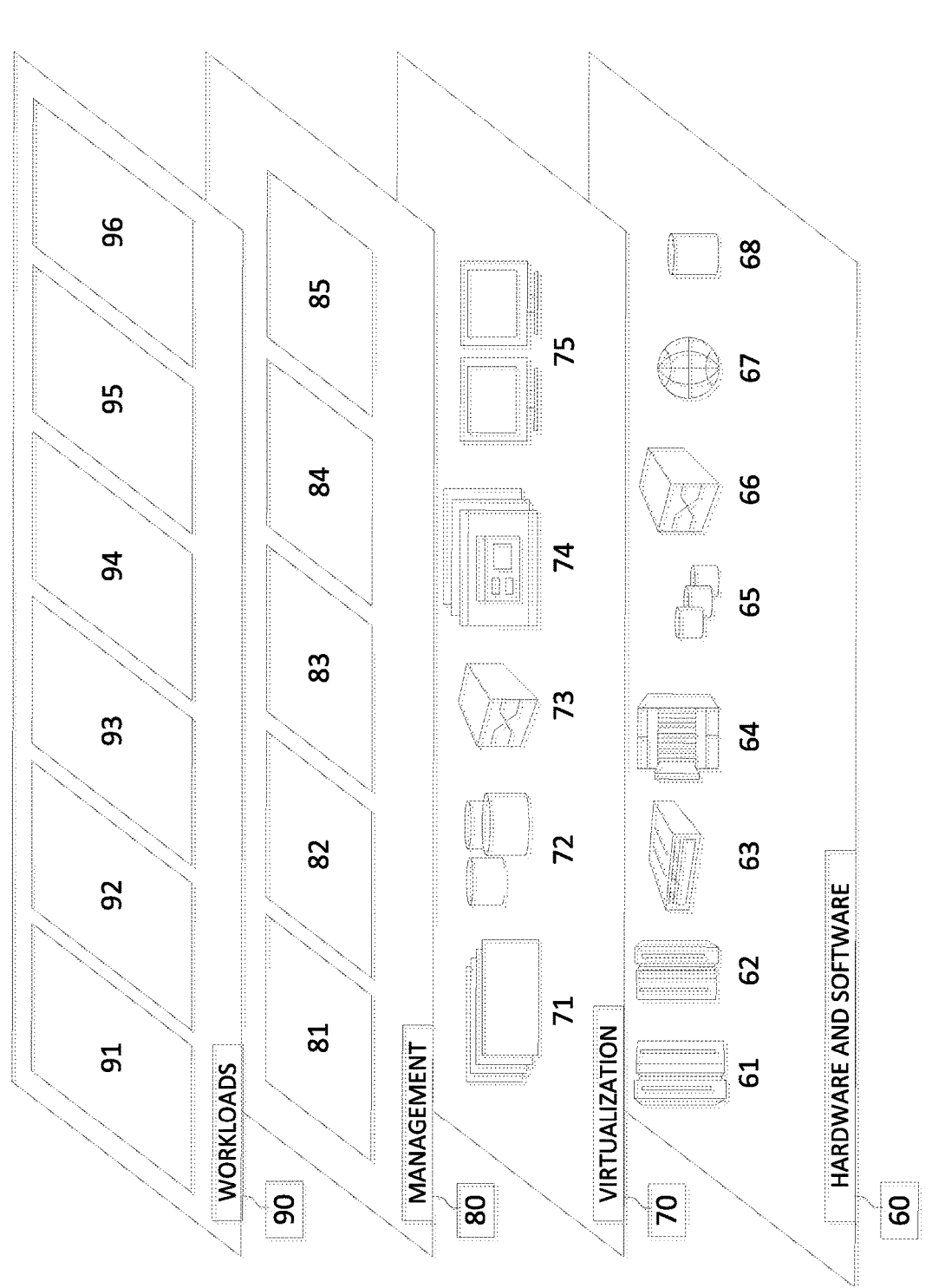
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multilingual learning processing 96.

The exemplary embodiments may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for multilingual learning, the method comprising:

training, for each language in a set of two or more languages, a model for a task;

identifying one or more important words appearing in at least two of the models;

weighting one or more negative conflicts and one or more positive overlaps between the one or more important words, wherein the one or more negative conflicts connote the one or more important words having a negative interference with joint learning;

generating a cluster of at least two languages of the set based on an aggregate of the weighting; and utilizing the cluster in one or more higher-order tasks selected from the group consisting of text classification, natural language inference, paraphrase detection, and Multilingual LM.

2. The method of claim 1, wherein the two or more languages are labelled for the task.

3. The method of claim 1, wherein the training is via fine-tuning a pretrained model.

4. The method of claim 1, wherein the task is selected from the group consisting of sentiment classification, natural language interference, and part-of-speech tagging.

5. The method of claim 1, wherein the weighting the one or more conflicts and the one or more overlaps is based on the task.

6. The method of claim 1, wherein the identifying one or more important words appearing in at least two of the models is based on the task.

7. A computer program product for multilingual learning, the computer program product comprising:

one or more non-transitory computer-readable storage media and program instructions stored on the one or more non-transitory computer-readable storage media capable of performing a method, the method comprising:

training, for each language in a set of two or more languages, a model for a task;

identifying one or more important words appearing in at least two of the models;

weighting one or more negative conflicts and one or more positive overlaps between the one or more important words, wherein the one or more negative conflicts connote the one or more important words having a negative interference with joint learning;

generating a cluster of at least two languages of the set based on an aggregate of the weighting; and utilizing the cluster in one or more higher-order tasks selected from the group consisting of text classification, natural language inference, paraphrase detection, and Multilingual LM.

8. The computer program product of claim 7, wherein the two or more languages are labelled for the task.

9. The computer program product of claim 7, wherein the training is via fine-tuning a pretrained model.

10. The computer program product of claim 7, wherein the task is selected from the group consisting of sentiment classification, natural language interference, and part-of-speech tagging.

11. The computer program product of claim 7, wherein the weighting the one or more conflicts and the one or more overlaps is based on the task.

12. The computer program product of claim 7, wherein the identifying one or more important words appearing in at least two of the models is based on the task.

13. A computer system for multilingual learning, the system comprising:

one or more computer processors, one or more computer-readable storage media, and program instructions stored on the one or more of the computer-readable storage media for execution by at least one of the one or more processors capable of performing a method, the method comprising:

training, for each language in a set of two or more languages, a model for a task;

identifying one or more important words appearing in at least two of the models;

weighting one or more negative conflicts and one or more positive overlaps between the one or more important words, wherein the one or more negative conflicts connote the one or more important words having a negative interference with joint learning;

generating a cluster of at least two languages of the set based on an aggregate of the weighting; and utilizing the cluster in one or more higher-order tasks selected from the group consisting of text classification, natural language inference, paraphrase detection, and Multilingual LM.

14. The computer system of claim 13, wherein the two or more languages are labelled for the task.

15. The computer system of claim 13, wherein the training is via fine-tuning a pretrained model.

16. The computer system of claim 13, wherein the task is selected from the group consisting of sentiment classification, natural language interference, and part-of-speech tagging.

17. The computer system of claim 13, wherein the identifying one or more important words appearing in at least two of the models and the weighting the one or more conflicts and the one or more overlaps is based on the task.

\* \* \* \* \*